United States Patent
Wu et al.

(10) Patent No.: US 6,712,996 B2
(45) Date of Patent: Mar. 30, 2004

(54) COLOR TEMPERATURE INDICATOR

(75) Inventors: Jun Wu, 1829 Orchard Pl., Apt. D, Urbana, IL (US) 61801; Yaomin Xia, 1323 Starglo Pl., San Jose, CA (US) 95131; Joseph W. Stucki, 3704 Meadow La., Champaign, IL (US) 61822

(73) Assignees: Joseph W. Stucki, Champaign, IL (US); Jun Wu, Sugar Land, TX (US); Yaomin Xia, San Jose, CA (US)

( * ) Notice: Subject to any disclaimer, the term of this patent is extended or adjusted under 35 U.S.C. 154(b) by 0 days.

(21) Appl. No.: 09/884,772

(22) Filed: Jun. 19, 2001

(65) Prior Publication Data

US 2002/0055578 A1 May 9, 2002

Related U.S. Application Data

(60) Provisional application No. 60/212,895, filed on Jun. 20, 2000.

(51) Int. Cl.[7] .............................................. G01K 11/14
(52) U.S. Cl. ................................. 252/408.1; 374/162
(58) Field of Search ..................... 252/408.1; 374/162; 501/112, 118, 122, 127, 133; 116/216

(56) References Cited

U.S. PATENT DOCUMENTS 4,411,530 A * 10/1983 Low et al. ..................... 366/4
4,601,588 A * 7/1986 Takahara et al. ............ 374/106

FOREIGN PATENT DOCUMENTS

JP         06319987 A * 11/1994 ............ B01J/13/04

OTHER PUBLICATIONS

Bond, Stephen P. et al. "Co-ordination compounds on the surface of laponite: tri-2-pyridylamine complexes," Journal of Materials Chemistry (1992), 2(1), pp. 37-41.*

* cited by examiner

*Primary Examiner*—Elizabeth McKane
(74) *Attorney, Agent, or Firm*—Greenlee, Winner and Sullivan, P.C.

(57) ABSTRACT

The invention relates to temperature indicating compositions which display temperature dependent color changes. The invention encompasses temperature indicating compositions, materials, devices and methods of their use. The temperature indicating compositions of the invention are clays that can be used to detect temperature and temperature changes at sub-ambient and particularly sub-zero ° C. temperatures. Temperature of a selected environment can be monitored by placing a temperature-sensitive composition comprising the clay material of this invention in contact with that environment and monitoring the color of the composition.

46 Claims, 3 Drawing Sheets

(1 of 3 Drawing Sheet(s) Filed in Color)

COLOR TEMPERATURE INDICATOR

CROSS-REFERENCE TO RELATED APPLICATIONS

This application takes priority under 35 U.S.C. §119(e) from U.S. provisional application Ser. No. 60/212,895, filed Jun. 20, 2000, which is incorporated herein to the extent that it is not inconsistent with the disclosure herein.

ACKNOWLEDGMENT OF FEDERAL RESEARCH SUPPORT

This invention was made with funding from the United States government through USDA-NRI grant AG98-35107-6313. The United States government has certain rights in this invention.

FIELD OF THE INVENTION

The invention relates to temperature indicating compositions which display temperature dependent color changes. The invention encompasses temperature indicating compositions, materials, devices and methods of their use. The temperature indicating compositions of the invention are clays that can be used to detect temperature and temperature changes at sub-ambient and particularly sub-zero ° C. temperatures.

BACKGROUND OF THE INVENTION

A wide variety of materials and methods are available for detecting temperature and temperature changes. Perhaps the most common example of a temperature indicating device is the mercury bulb thermometer. Bulb thermometers rely on the simple principle that the volume of a liquid expands upon heating and diminishes when cooled. Mercury bulb thermometers have become undesirable since mercury is highly toxic. In fact, many communities and areas in the United States are actively banning or limiting the use of mercury and mercury thermometers. Alcohol thermometers are being used in place of mercury thermometers and have a lower usable temperature range, generally from about −20° C. to about 200° C.

Electronic methods for monitoring temperature are also available. The electronic methods commonly rely on the changes in electrical resistance of materials as temperature changes. Changes in resistance are measured electronically to yield an output signal which can be correlated to temperature. Typically, electronic methods for measuring temperature are more expensive than bulb thermometers and other temperature indicating devices since electronic devices require electronic circuitry and/or computer interface.

Other types of temperature sensing devices can be used in applications for controlling temperature. The bimetallic strip thermometer is used in ovens and refrigerators alike to sense and control temperature. On a general level the bimetallic strip thermometer has two strips of metals or alloys fixed to one another which expand at different rates as temperature changes. The bimetallic strip is also in direct contact with a wire. As temperature changes, the bimetallic strip curves due to the different rates of thermal expansion of the metal strips and comes in contact with an electrode which allows current to flow through the bimetallic strip. The temperature is simply controlled by adjusting the size of the gap between the bimetallic strip and the electrode. The flow of current is linked to a mechanism for controlling temperature, i.e., a heat pump or a heater.

Another common device used for measuring temperature is called a thermocouple. A thermocouple consists of two wires made of different metals, or alloys, joined at each end. Typically, one junction is placed where the temperature measurement is being made, and the other is kept at a constant lower temperature. The Seebeck effect produces an electromotive force that is approximately proportional to the difference between the temperatures of the two junctions.

Type T thermocouples made of copper and constantan are commonly used to measure temperatures below 0° C. and typically have a range of −200° C. to about 350° C. Thermocouples need to be calibrated before use or have the temperatures read from standard tables and are expensive since they require circuitry and/or computer interface.

Although materials and methods for indicating temperature have existed for centuries, there is a continuing need for compositions, materials, and methods for indicating temperature which are inexpensive and amenable to facile use at sub-ambient and sub-zero ° C. temperatures.

SUMMARY OF THE INVENTION

The invention provides materials and methods for detecting changes in temperature by detecting a change in color of a clay material. The clay materials of this invention and methods employing them are useful for detecting temperature changes at sub-ambient temperatures, and particularly at temperatures below about 0° C. The clay material of this invention or a temperature-sensitive composition comprising the clay material of this invention exhibits changes in color over a range of sub-ambient temperatures. Temperature of a selected environment can be monitored by placing a temperature-sensitive composition comprising the clay material of this invention in contact with that environment and monitoring the color of the composition. A change in temperature is detected by detecting the color change visually or instrumentally.

The invention specifically relates to a clay material that changes color at temperatures below 0° C. Clay material that changes color at temperatures between about 0° C. and −270° C. is specifically disclosed. A particular disclosed clay material exhibits a dramatic color change from dark brown to bright green over this temperature range. The clay materials of this invention can be used to qualitatively detect an increase in temperature (increasing from below about −270° C. through about 0° C.) or to qualitatively detect a decrease in temperature (decreasing from above about 0° C. through about −270° C.). In a specific embodiment, the clay material is a dark brown colored (at ambient temperatures and depending on its water content), high-iron nontronite that changes color on cooling below about 0° C. through about −270° C. from greenish-brown, through yellow-green to bright green.

The invention includes temperature-sensitive compositions comprising the clay of this invention present in an amount ranging broadly from about 0.1% to about 99.9% by weight. Preferred compositions are listed in Table 1.

The invention also provides temperature indicators and temperature probes comprising a temperature-sensitive composition of this invention. These indicators or probes can take a variety of forms: powders, films, surface coatings, wafers, tubes, inks, paints, waxes, gels, and shaped articles (e.g., plates, vessels, containers, caps, etc.) with clay material admixed, suspended, impregnated therein or applied as a surface coating thereto.

The invention provides methods of detecting temperature and temperature changes. According to one embodiment of the invention, a method for detecting temperature comprises the steps of (a) contacting a temperature indicating material or device comprising a temperature indicating clay with an environment, and (b) determining the color of the temperature indicating material or device; whereby the temperature of the environment is correlated to the color of the material or device. According to another embodiment, the invention provides a method of detecting temperature change comprising the steps of (a) contacting a temperature indicating material or device comprising a temperature indicating clay with an environment, (b) determining the color of the temperature indicating material or device when it is in thermal equilibrium with the environment, and (c) monitoring the color of the temperature indicating material or device for color change; whereby a temperature change is detected when the color of the temperature indicating material or device changes.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE INVENTION

Figure 1A:
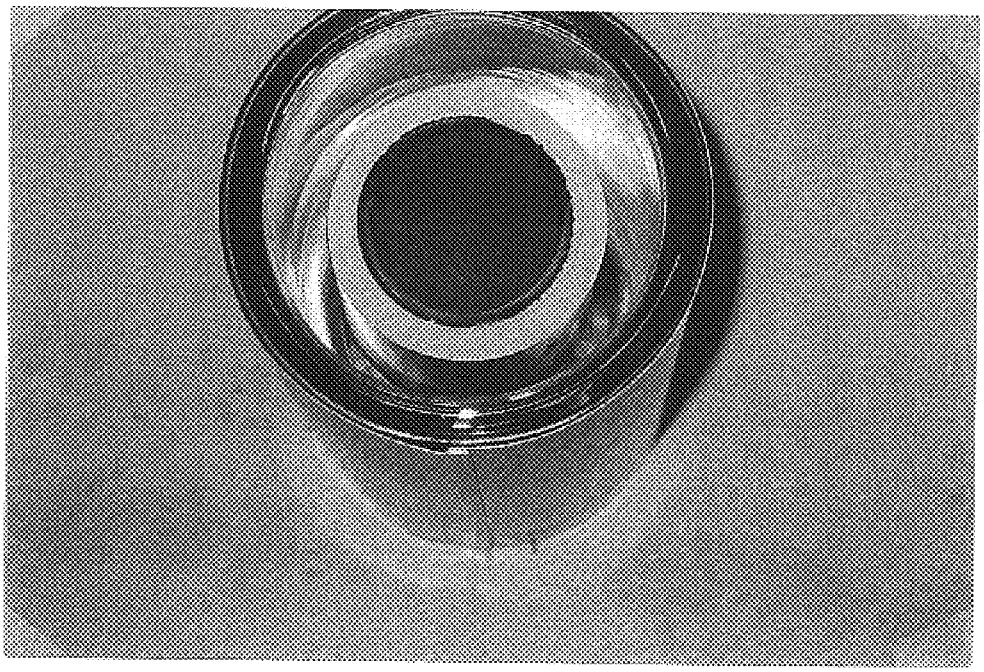
FIGS. 1A and 1B illustrate the color of a sample of the Uley Brown Nontronite clay at room temperature (1A, about 25° C., 298 K) and at liquid nitrogen temperature (1B, −196° C., 77 K).
Figure 1B:
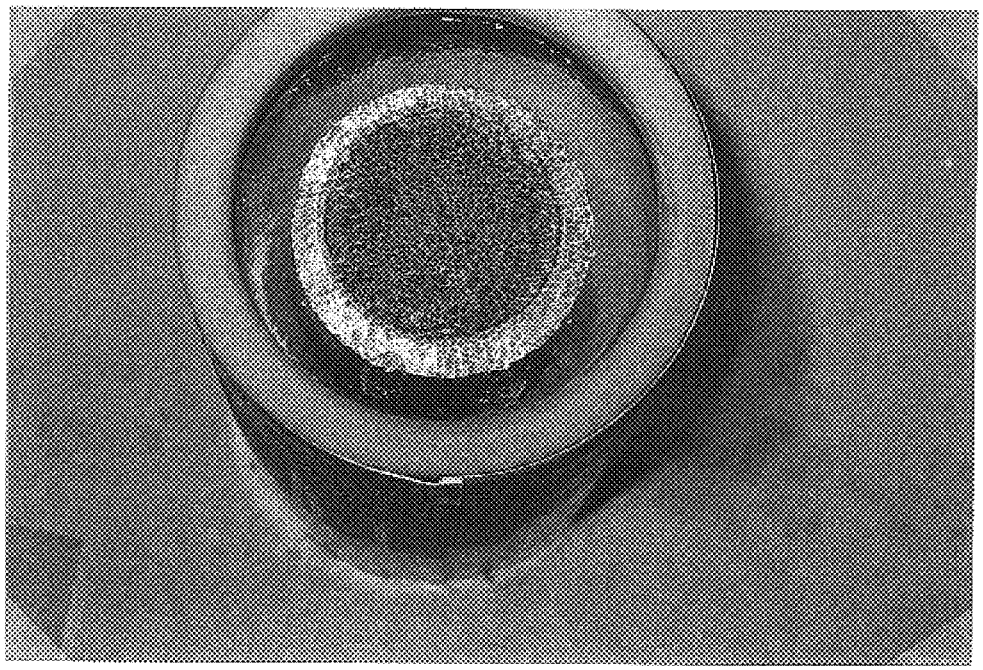

This invention relates to a clay material that exhibits a color change as a function of temperature. In particular, the invention relates to a clay material that exhibits a visually- or instrumentally-detectable change in color at sub-ambient temperatures. The invention specifically relates to a clay material that changes color at temperatures below 0° C. Clay material that changes color at temperatures between about 0° C. and −270° C. is specifically disclosed (0° C.=278 K). A particular disclosed clay material exhibits a dramatic color change from dark brown to bright green over this temperature range.

The temperature-sensitive clay materials of this invention can be employed as temperature indicators in devices that detect temperature changes. The clay materials of this invention can be used to qualitatively detect an increase in temperature (increasing from below about −270° C. through about 0° C.) or to qualitatively detect a decrease in temperature (decreasing from above about 0° C. through about −270° C.). The color change of the clay material with temperature is generally reversible and preferably reversibility is preserved over thousands of temperature cycles.

It has been found that heating a temperature-sensitive clay material above about 250° C. diminishes the color-change effect and that heating the clay material to a temperature of about 700° C. or more destroys the color-change effect.

Chemically reducing the clay material (e.g., treating the clay material with a reducing agent) destroys the temperature color-change effect. The temperature color-change effect can be restored upon oxidation of the chemically reduced material if the reduction takes place at room temperature. The temperature color-change effect cannot be restored by oxidizing material that was reduced at 70° C. Treatment with acid (e.g., sodium acetate), which is used to remove impurities from clays, does not destroy the color-change effect.

In a specific embodiment, the temperature-sensitive clay material of this invention is a phyllosilicate, of smectite type, that is a high-iron-content nontronite. The clay material contains Si, Al, Fe and Mg and at least a portion of the iron (ferric iron) in the clay material is believed to be tetrahedral iron. Ferric iron in clay is most often observed to be in the octahedral form. The clay material herein has high-iron content having up to about 10% to about 25% by weight of ferric iron and more typically having from about 15% to about 25% by weight of ferric iron. A significant portion from about 1% up to about 15% of the ferric iron is believed to be in the tetrahedral form. More typically, tetrahedral ferric iron is believed to be present in the clay material at a level of about 8 to 9% by weight or less. The clay material of this invention may be heterogeneous in composition and have average composition as disclosed herein.

In a specific embodiment, the clay material is a dark brown colored (at ambient temperatures and depending on its water content), high-iron nontronite that changes color on cooling below about 0° C. through about −270° C. from greenish-brown, through yellow-green to bright green. The most dramatic color changes are typically observed below about −75° C. One natural source of a clay material of this invention is Uley Brown Nontronite, found in intersecting fractures in highly weathered amphibolite in the Uley Graphite Mine, near the town of Port Lincoln, on the Eyre Peninsula, in South Australia. See: Frost, R. L. et al. (2000) *Thermochimica Acta* 346, 63–72 which provides the results of differential thermal analysis and thermogravimetry. Such methods can be employed to compare clays from different geographic locations.

Samples of Uley Brown Nontronite are available from the Source Clays Repository of the Clay Minerals Society, Department of Geological Sciences, University of Missouri (Columbia, Mo.) as deposit number NAu-2. The chemical composition of the deposit NAu-2 (Uley Brown Nontronite) is reported by The Source Clays Repository to be: $SiO_2$ (56.99%); $Al_2O_3$ (3.4); $Fe_2O_3$ (37.42%); MgO (0.34%); CaO (2.67%) $Na_2O$ (0.11%) and $K_2O$ (0.02%), from which the structural formula:

$$M^+_{0.97}[Si_{7.57}Al_{0.01}Fe_{0.42}][Al_{0.52}Fe_{3.32}Mg_{0.7}]O_{20}(OH)_4 \qquad I$$

was calculated. The exact structural formula based on chemical element analysis is subject to some variability depending on different interpretations by those who are skilled in the methods of calculating such formulae. A green clay found at the same site Uley Green Nontronite does not exhibit the color change temperature sensitivity observed with the Uley Brown Nontronite. The green clay from the Uley Graphite mine has also been placed with the Source Clays Repository as deposit number NAu-1.

Brown nontronite clay that has substantially the same composition and exhibits substantially the same color-change effect with temperature may be obtained from sites other than the Uley Graphite mine. Those of ordinary skill in the art will appreciate that methods are available and well-known in the art for comparing clays. Brown Nontronite clays from other sites can be readily compared with Uley Brown Nontronite to determine whether or not the clays have the same or similar composition. Samples of Uley Brown Nontronite are also maintained in the laboratory of one of the co-inventors hereof (J. W. Stucki) in the Natural Resources and Environmental Sciences Department at the University of Illinois (Urbana-Champaign, Ill.).

This invention encompasses temperature-sensitive compositions comprising a temperature-sensitive clay material having this stoichiometry of Formula I or a temperature-sensitive clay material the stoichiometry of which deviates from that of the formula by about 20% or less. Clay materials having stoichiometry of Formula I or stoichiometry within about a 5% deviation from that of the listed formula are preferred for use in temperature-sensitive compositions of this invention. Preferred temperature-sensitive clay materials retain a high-iron content.

The oxidation state and coordination environment of iron in clay can be measured by wet chemical methods and Mossbauer spectroscopy. The iron in the Uley Brown Nontronite clay of this invention is in the oxidized ferric state. Mossbauer spectroscopy shows the presence at 298 K of a central peak for ferric iron that is typical for nontronite clay minerals. At 100 K, however, the ferric iron peak is broadened at its base in a way that has not previously been observed for nontronite clay. It is presently believed that the color-change effect with temperature is due to changes in the molecular orbital configuration within the crystal structure of at least a portion of the clay mineral itself. Alternatively, the color change may be due to the presence of a trace impurity in the clay material, such as Ti—Fe—Co, however, purification of the clay material using a traditional acid purification treatment (sodium acetate solution at pH=5) did not affect the color change with temperature.

Clay materials of this invention include naturally-occurring clays as well as treated or purified naturally-occurring clays (so long as the purification or treatment does not destroy the color-change effect). Clay materials of this invention also include synthetic clays. Methods are known in the art for making synthetic clays of selected structure and composition. These methods can be applied to the synthesis of smectites having tetrahedral Fe(III), such as the nontronites of this invention. See, for example, Lajarige C et al. (1998)"Stabilization of $Fe^{2+}$ Ions in Synthetic Ferroan Smectites" *Compt. Rendus de l'Academie des Sciences Series II Fascicule A-Sciences de la Terre et des Planetes* 327,789–794; Martin, F. et al. (1998) "Ga/Al Substitutions in Synthetic Kaolinites and Smectites" *Clay Minerals,* 33, 231–241; Martin, F. et al. (1996) "Random Distribution of Ge and Si in Synthetic Talc-An EXAFS and FTIR Study" *Eur. J. Mineralogy,* 8, 289–299; Petit, S. et al. (1995) "Hydrothermal Synthesis (250° C.) of Copper-Substituted Kaolinites" *Clays and Clay Minerals,* 43, 482–494; Grauby O. et al. (1994) "The Nontronite-Saponite Series-An Experimental Approach" *Eur. J. Mineralogy,* 6, 99–112. These methods can be employed, in view of the disclosures herein characterizing the temperature-sensitive clay, what is known in the art about Uley Brown Nontronite, and in view of the samples of the Uley Brown Nontronite clay that are available, to synthesize a clay having stoichiometry (within about 20% or preferably within about 5%) of that of formula 1 above. Temperature-sensitive synthetic clays made by such methods can be employed in this invention.

Clay materials of this invention can be stored in freeze-dried form, and used in freeze-dried form or reconstituted, if desired, by addition of water.

The clay material of this invention can be admixed with or diluted into a carrier material, e.g., a transparent or semi-transparent carrier material, that allows any color change with temperature to be visually or instrumentally detected. The amount of clay material in the temperature-sensitive composition is sufficient to allow detection of the color change and preferably the amount of clay material in the composition is sufficient to allow detection of color change by visual inspection. A preferred carrier material is based on epoxy resins.

TABLE 1

Preferred amounts of clay and carrier material.

| Weight % | Clay | Carrier Material |
| --- | --- | --- |
| Preferred | 1–50% | 50–99% |
| More Preferred | 15–35% | 65–85% |
| Highly Preferred | 20–30% | 70–80% |

A temperature probe or indicator of this invention can simply be made by introducing a clay material of this invention or a temperature-sensitive composition comprising that clay material into a container or holder. A portion of the holder or container is transparent or semi-transparent to allow detection of a color change. The holder or container may be any shape, but is preferably a shape that provides good thermal contact with the environment to be temperature monitored and allows ready detection of the color change. The holder is preferably not thermally insulated at the surface in contact with the environment to be temperature monitored. However, other portions of the holder may be thermally insulated to provide accurate measurement of temperature changes. The holder or container is preferably sealed to prevent loss or contamination of the temperature-sensitive composition.

A temperature-sensitive clay material of this invention (naturally-occurring, which may be purified or treated, or synthetic) can be mixed with an epoxy, wax, plastic or other material that can be extruded, formed, pressed, shaped, molded, cured, or hardened or to generate a shaped article, e.g., a plate or tile, that is temperature-sensitive. For example, temperature-sensitive clay can be suspended in a clear epoxy resin prior to hardening to form an indicator device, e.g., a wafer, plate or strip that changes color with temperature change. Admixture with epoxy or plastics does not significantly change the temperature range over which the color change occurs. The color and color change of the clay material is not significantly affected by the use of colorless, transparent carrier material. The high and low temperature colors of the indicator can be affected by use of a carrier material that is itself colored. The high temperature color can be modified between brown and very dark brown by changing the hydration state of the clay. The clay material can be used as a powder, film or coating to impregnate or coat shaped articles to generate temperature indicators.

The clay material can be mixed or suspended into wax or related materials to prepare writing implements (e.g., crayons or colored pencils ) which can be used to mark items with temperature-sensitive markings. The clay material can be mixed into paints or inks to provide temperature-sensitive paints or inks. Temperature-sensitive waxes, paints or inks can be used to mark containers or print labels, particularly for transport or shipping containers for materials that must be kept at low-temperature, to provide a visual indication that the desired low temperature is being maintained.

The clay material can be suspended or mixed into gels, greases or foams to provide a temperature-sensitive gel, grease or foam. Such materials can be employed as sealants, lubricants or the like in the environment to be temperature monitored and function as temperature indicators which exhibit color change with temperature.

The clay material can be embedded in the wall of a vessel or container or embedded or suspended in the material (e.g., polycarbonate) used to make a vessel or container to make a temperature-sensitive vessel or container.

The clay material, applied as a powder, slurry, or suspension can be used to impregnate the pores of paper, cloth or related porous material to provide temperature-sensitive paper or cloth.

The clay material can be admixed with paint or paint base to impart temperature sensitivity to the color of the paint. Temperature-sensitive paint can be employed for painting vehicles, instruments, devices, containers, and other objects destined for use in low-temperature environments (e.g., polar regions, high altitudes, space travel, etc.)

In a specific application, the clay material of this invention can be used to make an indicator stick, e.g., a dip-stick, to measure the level of a cryogen (e.g., liquid nitrogen) in a cryostat or other dewar-like container. The indicator stick can be formed, for example, from a clear acrylic (or other clear plastic, such as polycarbonate or Plexiglas) tube. The tube is filled with clay material or a temperature-sensitive composition containing the clay material and the ends of the tube are sealed. Graduation marks can be etched or painted on the outside of the tube to allow for calibration of the level of cryogen. The tube is manually or mechanically inserted into the cryogen-containing vessel (tank or container). In one embodiment, an indicator stick can be manually inserted into a cryogen-containing vessel and removed to view the cryogen level. Alternatively, the indicator stick can be formed of a solid clear plastic material with clay material embedded or suspended therein. Alternatively, selected portions of the indicator stick can contain clay material, e.g., in the form of strips or lines of temperature-sensitive material along the length of the indicator stick. Further, an indicator stick can be made by painting lines on a plastic or other appropriate material using paint containing clay material. Any elongated material can be employed as a carrier for temperature-sensitive compositions of this invention to bring them into contact with the environment to be temperature monitored, e.g., a tube, a pole, a rigid tape, etc.). In particular embodiments, fiberglass can be coated or impregnated with the clay material of the invention.

Temperature indicators of this invention can also be provided with a color chart showing the change of color as a function of temperature to more quantitatively determine the temperature of the environment that is being monitored. The temperature indicator and color chart can be combined in a kit for temperature measurement. Various instrumental techniques can be applied to the use of the clay material of this invention, which employ a calibration curve of color as a function of temperature, to obtain quantitative temperature measurement over the sub-ambient temperature range.

The clay material of this invention can be used in thermal contact (direct or indirect) with the environment that is to be temperature monitored or as a component of a temperature-sensitive composition in thermal contact with the environment that is to be temperature monitored. The environment to be monitored includes any sub-ambient temperature environment, either a natural environment on earth (high altitudes, polar regions), in the earth's upper atmosphere, or in outer space (extraterrestrial environments, e.g., the Moon) or an artificial sub-ambient temperature environment, e.g., a freezer, low-temperature tanks, low-temperature shipping containers.

The present invention also includes articles incorporating temperature-sensitive clay of this invention that can be used to indicate temperature change or to provide temperature-sensitive marking or labels, including, but not limited to pencils, crayons, ink, paint, wafers, disks, tubes, plates, containers, vessels, boxes, greases, gels, etc.

The temperature indicators, probes or sensors of this invention can be used, for example, in:

medical equipment for various procedures that employ low-temperature devices or materials, e.g., wart-removal or treatment of other skin lesions with liquid nitrogen;

bio-life science sample storage containers, e.g., for storage or shipping of tissue or biological fluid samples, or for storage or shipping of microorganisms or cells;

cryogenic applications, e.g., where low temperature materials, such as liquid nitrogen, liquid helium, liquid oxygen, or dry ice are used or stored or for any item or device which is to be maintained at a temperature less than about 0° C.;

cryostage applications, e.g., where low temperatures are needed for instrumentation, e.g., electron microscopes, secondary ion mass spectrometers, etc.;

aerospace applications, e.g., for sensing or monitoring external or internal temperatures of a plane, or other vehicle;

applications of magnetic fields, e.g., to analytical instruments or medical diagnostic instruments, e.g., nuclear magnetic resonance instrumentation, that require the maintenance of low-temperatures for operation;

applications of superconducting materials, e.g., superconducting magnets, to sense temperature changes that might affect performance of such magnets;

as additives, thickeners or pigments in paper, paint, dyes or ink manufacture; or embedded into walls of reaction vessels or storage tanks for low temperature materials (e.g., liquid nitrogen tanks) as indicators of temperature or indicators of the level of low temperature material remaining in the storage tank.

Those of ordinary skill in the art will appreciate that methods, materials and procedures other than those specifically disclosed herein can be employed in the practice of this invention. All functional equivalents of materials, methods and procedures specifically disclosed herein are intended to be encompassed by this invention.

EXAMPLE 1

Determination of Reflectance Spectra

Figure 2:
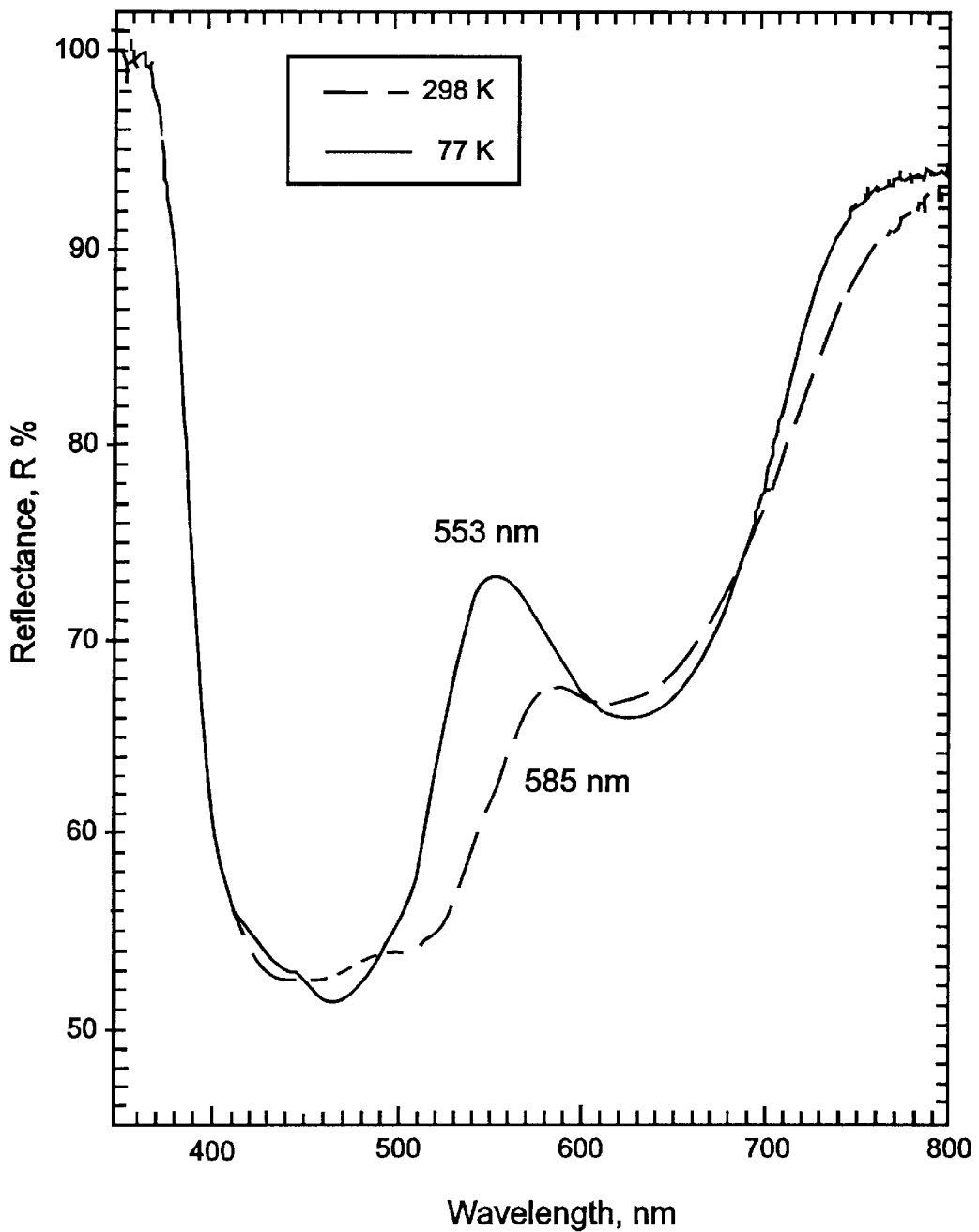
FIG. 2 is a graph of reflectance spectra of a sample of Uley Brown Nontronite, particle size <2 micron at 298 K (RT, dashed line) and 77 K (liquid nitrogen temperature, solid line). A visible reflectance peak at 585 nm at 298 K shifts to 553 nm at 77 K. The shift in color is systematic with changes in temperature below freezing.
Figure 3:
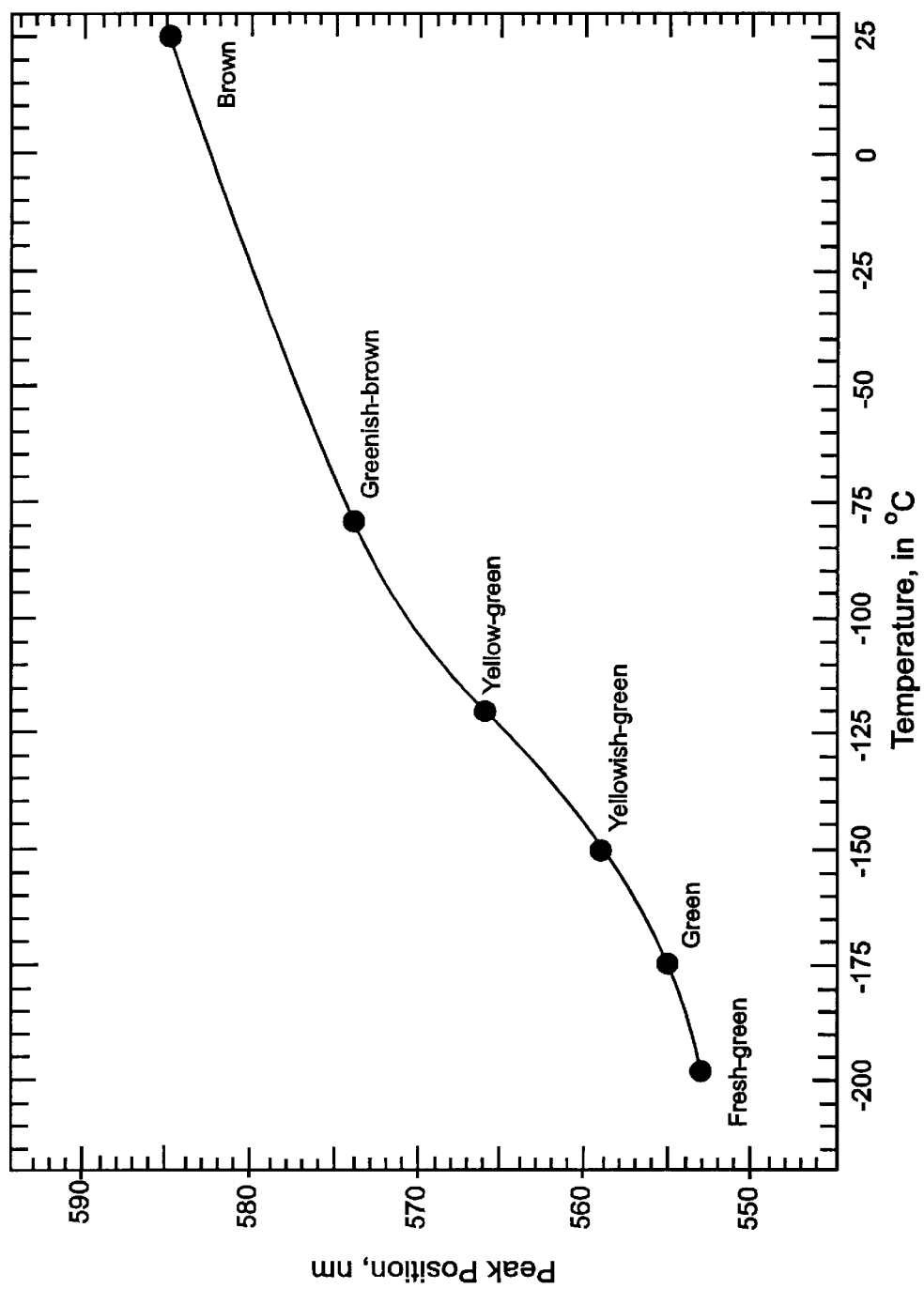
FIG. 3 is a graph illustrating the shift in the wavelength of the visible reflectance peak of Uley Brown Nontronite as a function of temperature (298 K to about 77 K). The color of the clay observed at several temperatures is indicated.

Reflectance spectra of the Uley Brown Nontronite, particle size <2 micron, at 298 K (RT, dashed line) and 77 K (liquid nitrogen temperature, solid line) were obtained using a Varian Cary 5 uv-visible spectrophotometer equipped with a diffuse reflectance sphere. A cryogenic sample holder was created by drilling a 2.5-cm diameter cylindrical hole about 6 cm deep into a 10-cm diameter cylindrical aluminum block. The aluminum block was then equilibrated at either room temperature, or at 77 K by inserting the block into a pool of liquid nitrogen. One end of a fiber optic cable was attached to the reflectance port of the spectrophotometer, and the other was covered with a cylindrical sleeve in which the dry clay powder was placed. As the sleeve was fitted to the end of the cable, the clay powder was pressed firmly against the end of the optical conducting fibers. The outside diameter of the sleeve was milled to fit snugly inside the cylindrical opening of the aluminum block. The temperature of the sample was monitored by a thermocouple. The entire uv-visible spectrum was then collected for each temperature, and plots of temperature vs color were created using diagnostic peak positions, such as that at about 585 nm. The results are depicted in FIG. 2.

EXAMPLE 2

Low Temperature Indicating Dip Stick Preparation

Option 1. An aqueous clay suspension was prepared with a clay concentration of 2–5 mg/mL. Using a porous plate filter apparatus, a clay film was made with a film density of about 5~6 mg/cm$^2$. The clay film was cut into small circles of about 5-mm diameter. The circles were attached to a strip (width=1.5 cm) of white cardboard with the help of clear epoxy adhesive, spaced about 0.5 inches (2 cm) apart, to create a dotted line of clay circles along the cardboard strip.

Option 2. Clay powder was added to a clear epoxy resin in a w/w ratio of 1:5 and mixed well. The mixture was transferred to a strip (width=1.5 cm) of white cardboard in the form of a thick line. After hardening, some cuts were made at a distance of every 0.5 inch, or 2-cm to provide gradations.

EXAMPLE 3

Low Temperature Indicating Wafer

Option 1. Approximately 0.2 to 0.3 g of dry clay powder was suspended per 1 g of clear epoxy resin. The suspension was mixed thoroughly and the resulting dispersion was poured onto a flat Teflon® sheet. The Teflon coated with the dispersion was allowed to cure for a length of time (specified by the epoxy used, typically 2 to 24 hr). Lastly, the cured dispersion was removed from the Teflon® sheet and wafers of the desired dimensions were cut.

Option 2. Alternatively, the clay-epoxy dispersion can be poured onto a white cardboard sheet and spread to desired a thickness. After curing for a length of time, wafers of the desired dimensions were cut.

Option 3. Calibrated wafer. A color/temperature calibration strip was added to the side of the area of the cardboard where the clay-epoxy dispersion is to be deposited.

What is claimed is:

1. A temperature indicator comprising a temperature-indicating clay that changes color at temperatures from between about 0° C. to about −270° C. and a carrier wherein the temperature-indicating clay is adhered to, impregnated in or coated on said carrier.

2. The temperature indicator of claim 1 wherein the temperature-indicating clay is dark brown at about 0° C. and bright green at about −270° C.

3. The temperature indicator of claim 1 wherein the color of the temperature-indicating clay is qualitatively correlated to the temperature of the clay.

4. The temperature indicator of claim 1 wherein the color change is reversible.

5. The temperature indicator of claim 1 wherein the temperature-indicating clay is a phyllosilicate.

6. The temperature indicator of claim 5 wherein the phyllosilicate is a smectite phyllosilicate.

7. The temperature indicator of claim 6 wherein the temperature-indicating clay is a high-iron-content nontronite.

8. The temperature indicator of claim 1 wherein the temperature-indicating clay comprises Si, Al, Fe, and Mg.

9. The temperature indicator of claim 8 wherein the temperature-indicating clay comprising ferric iron.

10. The temperature indicator of claim 9 wherein the temperature-indicating clay comprises from about 10% to about 25% by weight of ferric iron.

11. The temperature indicator of claim 9 wherein the temperature-indicating clay comprises from about 15% to about 25% by weight of ferric iron.

12. The temperature indicator of claim 9 wherein the ferric iron is tetrahedral ferric iron.

13. The temperature indicator of claim 12 wherein the temperature-indicating clay comprises from about 1% to about 15% tetrahedral ferric iron.

14. The temperature indicator of claim 12 wherein the temperature-indicating clay comprises less than about 9% tetrahedral ferric iron.

15. The temperature indicator of claim 1 wherein the temperature-inndicating clay has a structural formula of: $M^+_{0.97}[Si_{7.57}Al_{0.01}Fe_{0.42}][Al_{0.01}Fe_{3.32}Mg_{0.7}]O_{20}(OH)_4$ or deviates from said structural formula by about 20% or less.

16. The temperature indicator of claim 15 wherein the temperature-indicating clay deviates less than 5% from said structural formula.

17. The temperature indicator of claim 1 wherein the temperature-indicating clay comprises a clay having a chemical composition within 20% by weight of $SiO_2$ (56.99%) $Al_2O_3$ (3.4%) $Fe_2O_3$ (37.42%) MgO (0.34%) CaO (2.67%) $Na_2O$ (0.11%) $K_2O$ (0.02%).

18. The temperature indicator of claim 17 wherein the temperature-indicating clay comprises a clay within 5% of said chemical composition.

19. The temperature indicator of claim 1 wherein the temperature-indicating clay comprises a Brown Nontronite clay.

20. The temperature indicator of claim 1 wherein the temperature-indicating clay comprises an Uley Brown Nontronite clay.

21. The temperature indicator of claim 1 that is a wafer, strip, disk, dip-stick, indicator stick, tube, plate, probe, sensor, container, cap, vessel, box, grease, gel, foam, sealant, paint, ink, or wax.

22. The temperature indicator of claim 1 that is an indicator or dip-stick.

23. The temperature indicator of claim 1 that is a wafer or strip.

24. The temperature indicator of claim 1 paint, ink, or strip.

25. The temperature indicator of claim 1 further comprising a device or equipment that operates below 0° C.

26. The temperature indicator of claim 1 wherein the carrier is a transparent or semi-transparent carrier.

27. The temperature indicator of claim 26 wherein the transparent or semitransparent carrier is epoxy or plastic.

28. The temperature indicator of claim 1 wherein the clay is between about 15% to about 35% of the total weight of clay and carrier.

29. The temperature indicator of claim 1 wherein the temperature-indicating clay is adhered to, impregnated in, or coated on a surface of the carrier.

30. The temperature indicator of claim 29 wherein carrier is a cardboard or paper surface.

31. A method of detecting temperature comprising the steps of (a) contacting a temperature indicating material or device comprising a temperature indicating clay with an environment, and (b) determining the color of the temperature indicating material or device; whereby the temperature of the environment is correlated to the color of the material or device.

32. The method of claim 31 wherein the temperature is a sub-ambient temperature.

33. The method of claim 31 wherein the temperature is below about 0° C.

34. The method of claim 31 wherein the environment is selected from the group consisting of natural or artificial environments.

35. The method of claim 34 wherein the artificial environment comprises medical equipment, bio-life science sample storage containers, cryogenic related devices, aerospace related equipment, equipment related to magnetic fields, equipment related superconducting material, equipment related to outer space, and equipment that is to operate at sub-ambient temperatures.

36. The method of claim 31 wherein the temperature indicating material comprises about 0.1% to about 99.9% by weight of the temperature indicating clay.

37. The method of claim 31 wherein the temperature indicating material comprises about 15% to about 35% by weight of the temperature indicating clay.

38. The method of claim 31 wherein the color of the temperature-indicating material is detected instrumentally.

39. A method of detecting temperature change comprising the steps of (a) contacting a temperature indicating material or device comprising a temperature-indicating clay with an environment, (b) determining the color of the temperature indicating material or device when it is in thermal equilibrium with the environment, and (c) monitoring the color of the temperature indicating material or device for color change; whereby a temperature change is detected when the color of the temperature indicating material or device changes.

40. The method of claim 39 wherein the temperature change is in the sub-ambient range.

41. The method of claim 39 wherein the temperature change is below 0° C.

42. The method of claim 39 wherein the environment is a natural or artificial environment.

43. The method of claim 42 wherein the artificial environment comprises medical equipment, bio-life science sample storage containers, cryogenic related equipment, aerospace related equipment, equipment related to magnetic fields, equipment related superconducting material, equipment related to outer space, and equipment that is to operate at sub-ambient temperatures.

44. A kit for determining the temperature of an environment which comprises a temperature-indicating composition containing a temperature-indicating clay and a suitable carrier and a color chart showing the change of color of the temperature-indicating composition due to the color change of the temperature-indicating clay as a function of temperature.

45. The kit of claim 44 wherein the carrier is a paint, a wax, an ink, an epoxy, acrylic, polycarbonate, paper, cloth, or clear plastic.

46. The kit of claim 44 useful to provide temperature-sensitive marking or labels which comprises a writing implement comprising the temperature-indicating composition.

* * * * *